Nov. 7, 1961 — J. E. OLNEY — 3,007,714
BOAT TRAILER WITH IMPROVED SHOCK ABSORBER
Filed March 17, 1960
FIG.1
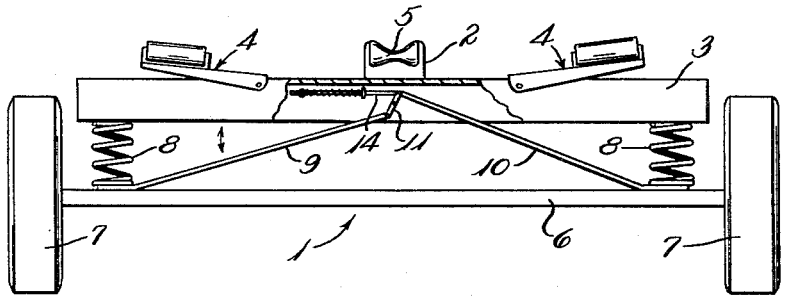
FIG.2
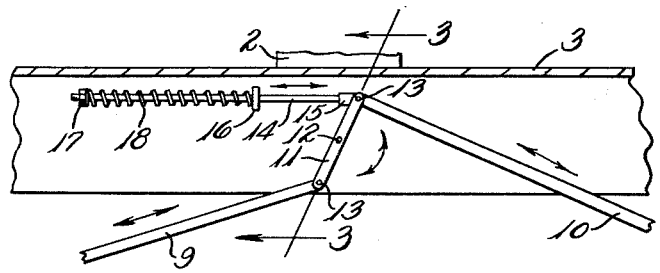
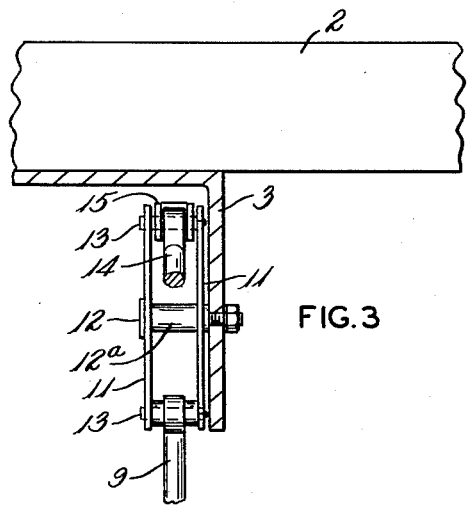
FIG.3
INVENTOR.
JAMES E. OLNEY
BY Oldham & Oldham
ATTYS

United States Patent Office 3,007,714
Patented Nov. 7, 1961

3,007,714
BOAT TRAILER WITH IMPROVED SHOCK ABSORBER
James E. Olney, 180 Northview Drive, Canfield, Ohio
Filed Mar. 17, 1960, Ser. No. 15,564
3 Claims. (Cl. 280—124)

The present invention relates to boat trailers, and especially to improved shock absorber and sway equalizer means in boat trailers to aid in controlling relative movement between the running gear and the trailer frame means.

Heretofore there have been various types of trailer designs proposed and many different types of trailers have been built commercially. However, there can be a wide variation in the load applied to the trailers, and it is rather costly to provide sturdy shock absorber means with a good service life in the trailers. Furthermore, various types of sway bar control means and other equivalent members have been provided and are required in quality trailers to try to control or limit lateral sway of the trailer frame means and load thereon with relation to the running gear.

The general object of the present invention is to provide a novel and improved boat trailer having improved shock absorber means thereon connecting the trailer frame and the running gear assembly.

Another object of the invention is to use the shock absorber means in the boat trailer to aid in equalizing relative vertical movement of different portions of the running gear with relation to cross bar means, or similar members on the trailer frame.

A further object of the invention is to provide special shock absorber means in a boat trailer extending transversely of the running gear and connecting such shock absorber means to the trailer frame for resiliently resisting relative vertical movement of the running gear and frame and for endeavoring to equalize vertical displacement of different portions of the running gear with relation to the frame.

Further objects of the invention are to control the lateral sway of the trailer frame and load means thereon with relation to the running gear; to provide adjustable means in the shock absorber assembly for permitting the trailer owner or operator to set up varying resistance to vertical deflection of the trailer frame with relation to the running gear; to provide a relatively sturdy shock absorber made from a few operative parts each of which has a long service life and with no appreciable maintenance being required on the shock absorber even after extended periods of use, and to provide a new and improved trailer construction having desirable operative properties.

The foregoing and other objects and advantages of the invention will be made more apparent as the specification proceeds.

Attention now is directed particularly to the accompanying drawings wherein one currently preferred embodiment of the invention is shown and wherein:

FIG. 1 is a back end elevation of a boat trailer of the invention, with portions of the cross bar member being broken away and shown in section to bring the shock absorber means of the invention into view;

FIG. 2 is an enlarged fragmentary vertical section of portion of the trailer frame means and the associated shock absorber and equalizer assembly; and FIG. 3 is an enlarged vertical section taken on line 3—3 of FIG. 2.

When referring to corresponding members shown in the drawing and referred to in the specification, corresponding numerals are used to facilitate comparison therebetween.

Generally speaking, the present invention relates to a boat trailer construction, and to shock absorber means provided therein at the connection between the running gear and the trailer frame, and the invention particularly relates to a pair of connector means, one end of which is secured to the running gear to extend generally transversely inwardly thereof, a lever pivotally secured to the trailer frame and having two oppositely extending lever arms, the connector means lying in and defining a plane and with the lever being positioned for pivotal movement in such plane, the other ends of each of the connector means being secured to a different one of the lever arms, and shock absorber means operatively engaging the lever and being connected to the frame means for snubbing movement of the lever to resist relative displacement between the trailer frame and the running gear.

Attention is now particularly directed to the details of the structure shown in the drawings, and a boat trailer 1 is shown in the accompanying drawings. Such boat trailer 1 may be of substantially conventional construction insofar as the provision of frame means and running gear means therefor is concerned. Thus a center frame pole 2 is shown and it has a conventional member such as a channel shaped, downwardly facing cross bar 3 secured to such center frame pole 2 and extending transversely thereof while boat support means such as lever arm and roller units 4 are shown carried by and suitably secured to the cross bar 3. A roller 5 may be journalled on and suitably secured to the center frame pole 2 at the back end thereof to aid in loading and unloading boats with relation to the boat trailer 1.

The running gear of the trailer 1 includes a conventional axle 6 with wheels 7 journalled thereon. Coil springs 8 are suitably secured to and extend between the axle 6 and the cross bar 3 to resiliently support the center frame pole, or other frame means in the boat trailer 1 upon the running gear thereof.

As an important feature of the present invention, suitable connector members, in this instance metal bars or rods 9 and 10, are secured as by bolts or welding at the outer ends thereof to the axle 6. These bars 9 and 10 extend transversely of the boat trailer 1 and extend upwardly and inwardly from the secured ends thereof. The metal bars 9 and 10 lie in and define a plane which extends transversely of the frame means for the boat trailer 1. To connect the metal bars 9 to the frame means for the trailer 1, a pair of levers 11 are operatively journalled on, or pivotally secured to a portion of the frame means, such as to the cross bar 3, by a suitable member, such as a bolt 12 shown in FIG. 3. The levers 11 are mounted in spaced alignment on and within the cross bar 3 as by a spacer 12a on the bolt 12, and form two lever arms extending in opposite directions from the bolt or other fulcrum member for the levers 11. The free ends of the metal bars or rods 9 and 10 are in journalled engagement with the free ends of the individual lever arms formed on the levers 11 and are secured thereto, as by means of pins 13 or the like, for relative pivotal movement between the levers 11 and the associated ends of the metal bars 9 and 10. The arrangement between the levers 11 and the metal bars 9 and 10 is such that on relative vertical movement between the frame means of the boat trailer and the running gear therefor, the adjacent ends of the metal bars 9 and 10 will be urged to move towards each other, or to try to move transversely of the boat trailer frame and in so doing will pivot or rock the levers 11 about the fulcrum bolt or pin 12 provided therefor.

A snubbing or resilient movement resisting force is set up on the levers 11, as by means of a control rod 14, that may have an engagement member such as a clevis 15 secured to one end thereof. This clevis 15 engages one of the pins 13 securing the metal bar 10 to one end of the levers 11 for pivotal movement of the control rod with relation to the remainder of the assembly. The control rod 14 also engages suitable anchor means, such as a positioning bracket 16, secured to the cross bar 3 and with the control rod extending through a suitable aperture or slot provided in the bracket 16. The free end of the control rod 14 may, for example, be threaded to engage a nut 17, so that a coil spring 18 can be carried by the control rod 14 and be compressed between one face of the bracket 16 and the associated surface of the nut 17 to set up a controllable, resilient force on the levers 11 to limit pivotal movement thereof. Relative movement of only one wheel 7 with relation to the frame 2 will be resisted by the bars 9 and 10 trying to equalize relative vertical movement of the frame and both ends of the axle 6.

In all events, the present invention provides snubber and equalizer means tending to resiliently resist relative displacement between portions of the running gear with relation to the trailer frame and with a controllable snubbing force being set up by the apparatus of the invention. Side sway of the frame 2 is also resisted by the bars 9 and 10 and associated means. This shock absorber and equalizer means is of relatively inexpensive, but sturdy construction and can give a long serivce life with a minimum of maintenance. The shock absorbing forces can be adjusted for various loads applied to the trailer, and an improved shock absorber construction having minimum parts therein has been provided by the invention. Thus it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

I claim:

1. In a boat trailer having a frame means, a channel shaped downwardly facing cross bar operatively secured to said frame, running gear means including an axle, and spring means supporting said frame means and cross bar on said running gear means, the improvement comprising a pair of bar members each secured at one end thereof to different lateral margins of said axle and extending transversely inwardly thereof, lever means pivotally secured at its center to said cross bar for movement parallel to the axis thereof, said lever means being positioned within said cross bar, means pivotally securing each of said bar members to opposite arms of said lever means, a control rod pivotally secured to said lever means adjacent one end thereof, a guide and stop bracket secured to said cross bar and engaging said control rod, and spring means operatively positioned between and engaging said guide and stop bracket and said control rod whereby relative vertical movement of said axle and cross bar produces pivotal movement of said lever means and said spring means exerts a snubbing action to such movement through said control rod.

2. In a boat trailer having a frame means including a channel shaped downwardly open cross bar operatively secured to said frame, running gear means including an axle, and spring means supporting said frame means and cross bar on said running gear means for relative vertical movement, the improvement comprising a pair of bar members each secured at one end thereof to different lateral margins of said axle and extending transversely inwardly of the trailer, lever means operatively and pivotally secured to said frame means for movement in a plane extending transversely thereof, said lever means having a pair of oppositely directed lever arms, means pivotally securing each of said bar members to an opposite arm of said lever means to produce pivotal movement of said lever means on relative vertical movement of said lever means adjacent one end thereof, a control rod pivotally secured at one end to said lever means, a guide and stop bracket secured to said cross bar and engaging said control rod, an adjustment nut carried by said control rod, and spring means operatively positioned between said guide and stop bracket and said adjustment nut on said control rod whereby relative vertical movement of said axle and frame means produces pivotal movement of said lever means and said spring means exerts a snubbing action to such movement through said control rod; said lever means, said control rod, said guide and stop bracket, and said spring means all being positioned in protected locations within said cross bar.

3. In a boat trailer having a frame means including a cross bar operatively secured to said frame, running gear means including an axle, and spring means supporting said frame means and cross bar on said running gear means for relative vertical movement, the improvement comprising a pair of bar members each secured at one end thereof to different lateral margins of said axle and extending transversely inwardly of the trailer, lever means operatively and pivotally secured to said frame means intermediate the ends of said lever means for movement in a plane extending transversely thereof, said lever means having a pair of oppositely directed lever arms, means pivotally securing each of said bar members to an opposite arm of said lever means to produce pivotal movement of said lever means on relative vertical movement of said lever means adjacent one end thereof, a control rod one end of which pivotally engages said lever means at one end thereof, a guide and stop bracket secured to said cross bar and engaging said control rod, an adjustment nut adjustably engaging said control rod at the other end thereof, and spring means operatively and compressively positioned between said guide and stop bracket and said adjustment nut on said control rod whereby relative vertical movement of said axle and frame means produces pivotal movement of said lever means and said spring means exerts a snubbing action to such movement through said control rod.

References Cited in the file of this patent

UNITED STATES PATENTS

| | | |
|---|---|---|
| 1,577,441 | Bakken | Mar. 23, 1926 |
| 2,872,210 | Shaffer | Feb. 3, 1959 |